United States Patent
Roy et al.

(10) Patent No.: US 12,450,094 B2
(45) Date of Patent: Oct. 21, 2025

(54) METHODS AND APPARATUS FOR WORKLOAD SCHEDULING

(71) Applicant: Arm Limited, Cambridge (GB)

(72) Inventors: Rishav Roy, West Lafayette, IN (US); Supreet Jeloka, Austin, TX (US); Shidhartha Das, Upper Cambourne (GB); Rahul Mathur, Austin, TX (US)

(73) Assignee: Arm Limited, Cambridge (GB)

( * ) Notice: Subject to any disclaimer, the term of this patent is extended or adjusted under 35 U.S.C. 154(b) by 617 days.

(21) Appl. No.: 17/874,658

(22) Filed: Jul. 27, 2022

(65) Prior Publication Data
US 2024/0036923 A1 Feb. 1, 2024

(51) Int. Cl.
G06F 9/48 (2006.01)
G06F 9/50 (2006.01)

(52) U.S. Cl.
CPC .............. *G06F 9/4893* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5083* (2013.01); *G06F 9/5088* (2013.01)

(58) Field of Classification Search
CPC ........ G06F 9/48; G06F 9/4806; G06F 9/4843; G06F 9/4856; G06F 9/4881; G06F 9/4893; G06F 9/50; G06F 9/5005; G06F 9/5027; G06F 9/505; G06F 9/5083; G06F 9/5088; G06F 9/5094; G06F 1/3287; G06F 1/329; G06F 2209/502
See application file for complete search history.

(56) References Cited

U.S. PATENT DOCUMENTS

| | | | | |
|---|---|---|---|---|
| 2009/0222654 A1* | 9/2009 | Hum | ..................... | G06F 1/3203 |
| | | | | 713/323 |
| 2012/0271480 A1* | 10/2012 | Anderson | ............. | G06F 1/3206 |
| | | | | 700/299 |
| 2012/0272086 A1* | 10/2012 | Anderson | ............... | G06F 1/206 |
| | | | | 713/340 |
| 2013/0079946 A1* | 3/2013 | Anderson | ............. | G06F 9/5083 |
| | | | | 700/299 |
| 2015/0106640 A1* | 4/2015 | Brackman | ............. | G06F 9/5094 |
| | | | | 713/324 |

(Continued)

OTHER PUBLICATIONS

Coskun et al, "Dynamic Thermal Management in 3D Multicore Architectures", 978-3-9810801-5-5/DATE09 © 2009 EDAA. pp. 1-6 (Year: 2009).*

(Continued)

*Primary Examiner* — Charles M Swift
(74) *Attorney, Agent, or Firm* — NIXON & VANDERHYE P.C.

(57) ABSTRACT

Aspects of the present disclosure relate to an apparatus comprising a plurality of processing elements having a spatial layout, and control circuitry to assign workloads to said plurality of processing elements. The control circuitry is configured to, based on a timing parameter, determine one or more active processing elements to deactivate; determine, based on the spatial layout, one or more inactive processing elements to activate; and deactivate said one or more active processing elements and activate said one or more inactive processing elements.

17 Claims, 6 Drawing Sheets

(56) References Cited

U.S. PATENT DOCUMENTS

2018/0217645 A1\* 8/2018 Zhang .................. G06F 9/5027

OTHER PUBLICATIONS

Zhu et al, "Three-Dimensional Chip-Multiprocessor Run-Time Thermal Management", IEEE Transactions on Computer Aided Design of Integrated Circuits and Systems, vol. 27, No. 8, Aug. 2008, pp. 1479-1492 (Year: 2008).\*

Zhou et al, "Thermal-Aware Task Scheduling for 3D Multicore Processors", IEEE Transactions on Parallel and Distributed Systems, vol. 21, No. 1, Jan. 2010, pp. 60-71 (Year: 2010).\*

\* cited by examiner

METHODS AND APPARATUS FOR WORKLOAD SCHEDULING

BACKGROUND

The present technique relates to the field of management of processing apparatuses which comprise a plurality of processing elements, for example multi-core systems. Such processing elements may be throttled based on performance considerations. For example, at one time, processing power may be increased, for example by increasing a clock speed of the processing elements, in order to increase processing capacity. At another time, a clock speed of one or more processing elements may be throttled to reduce power consumption and/or reduce system temperature.

Such considerations can limit performance. For example, in order to keep a processing apparatus within thermal limits, it may be unavoidable to reduce processing power, thereby reducing processing performance.

There is thus a desire for ways of managing such a processing apparatus to minimise performance loss whilst satisfying thermal requirements.

SUMMARY

At least some examples provide an apparatus comprising:
a plurality of processing elements having a spatial layout; and
control circuitry to assign workloads to said plurality of processing elements, said control circuitry being configured to, based on a timing parameter:
determine one or more active processing elements to deactivate;
determine, based on the spatial layout, one or more inactive processing elements to activate; and
deactivate said one or more active processing elements and activate said one or more inactive processing elements.

Further examples provide a method comprising:
assigning workloads to a plurality of processing elements having a spatial layout; and based on a timing parameter:
determining one or more active processing elements to deactivate;
determining, based on the spatial layout, one or more inactive processing elements to activate; and
deactivating said one or more active processing elements and activating said one or more inactive processing elements.

Further examples provide a non-transitory computer-readable medium to store computer-readable code for fabrication of an apparatus comprising:
a plurality of processing elements having a spatial layout; and
control circuitry to assign workloads to said plurality of processing elements, said control circuitry being configured to, based on a timing parameter:
determine one or more active processing elements to deactivate;
determine, based on the spatial layout, one or more inactive processing elements to activate; and
deactivate said one or more active processing elements and activate said one or more inactive processing elements.

Further aspects, features and advantages of the present technique will be apparent from the following description of examples, which is to be read in conjunction with the accompanying drawings.

DESCRIPTION OF EXAMPLES

Figure 1:
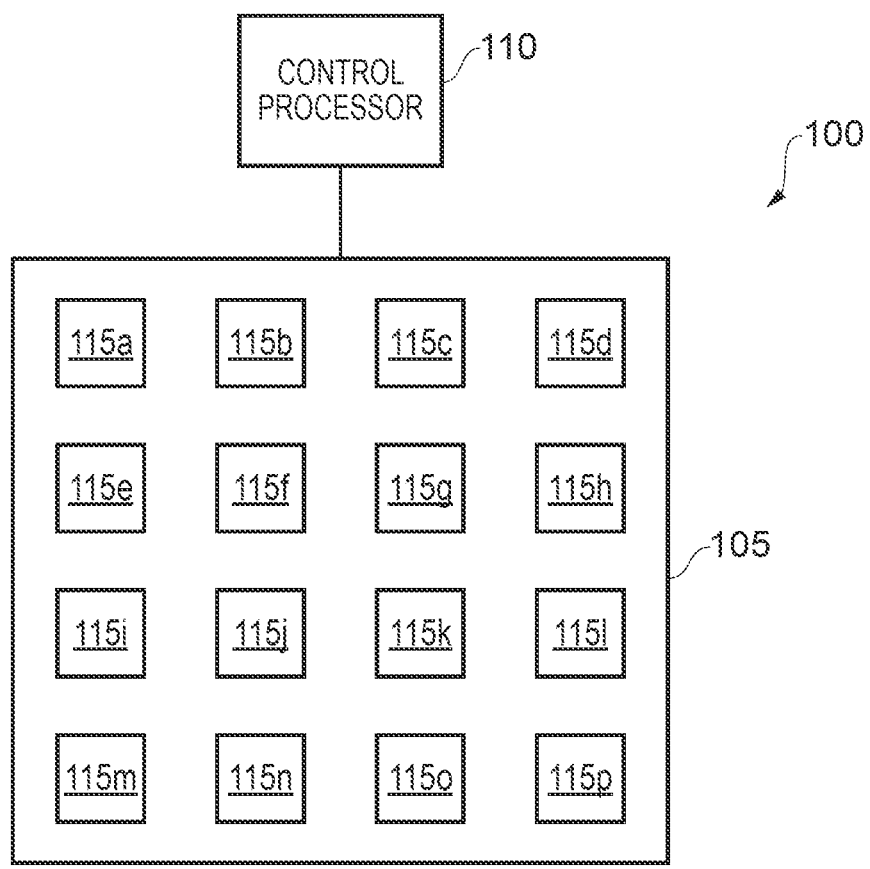
FIG. 1 schematically depicts a multi-core processor according to an example.

As mentioned above, an example apparatus comprises a plurality of processing elements. The apparatus may be a multi-core processing apparatus, wherein each processing element is a core of said apparatus. For example, the apparatus may comprise a single die. The processing elements have a spatial layout. For example, the elements may be laid out in a two-dimensional grid. Alternatively, the elements may have a three-dimensional layout, for example as multiple stacked grids of processing elements.

The apparatus further comprises control circuitry configured to assign workloads to the plurality of processing elements. The control circuitry may be a system control processor. The workloads may be streams of processing instructions. For example, each such stream may correspond to a function or other processing flow. The control circuitry is able to activate and deactivate processing elements. For example, it can migrate a given workload from a first processing element to a second element, and then deactivate the first element.

The control circuitry is configured to determine one or more active processing elements to deactivate. For example, this may be in response to said one or more active processing elements exceeding, or being expected to exceed, a temperature threshold.

The control circuitry is further configured to determine, based on the spatial layout, one or more inactive processing elements to activate.

This determination may be based on the spatial location of each of said one or more active processing elements within the spatial layout, and the spatial location of each of said one or more inactive processing elements within the spatial layout. For example, the control circuitry may determine to activate one or more inactive elements which are relatively spatially distant from the currently active elements. This improves the rate at which heat will dissipate from the currently active elements once they are deactivated.

The control circuitry then deactivates said one or more active processing elements, and activates said one or more inactive processing elements. The aforementioned determining, activation and deactivation is performed based on a timing parameter. For example, elements may be deactivated and activated at a given rate based on the thermal properties of the apparatus. The rate can be tuned to minimise the rate of switching between processing elements (thereby reducing the overhead associated with each switching operation), whilst allowing for dissipation of heat from recently-deactivated processing elements.

The present apparatus provides significant improvements in heat dissipation. This also improved performance relative to comparative examples in which processing elements are activated and deactivated without taking into account their spatial locations. These improvements in heat dissipation lead to a concurrent improvement in processing performance: a larger number of processing elements, and/or a higher clock speed of each processing element, can be used whilst remaining within thermal limits.

As explained above, the control circuitry may be configured to determine which elements to activate and deactivate based on their spatial locations. This may be based on their relative spatial locations, for example in terms of the distance between the spatial location of the one or more active elements (to deactivate) and the one or more inactive elements (to activate). The control circuitry may select elements to maximise this distance and/or to ensure that this distance exceeds a threshold. Such a threshold may be selected based on the thermal properties of the apparatus, e.g. such that a newly-activated element is sufficiently far from a recently-deactivated element that it has not been residually heated by way of its proximity to the recently-deactivated element. This assessment of distance may also be subject to one or more additional conditions. For example, it may be enforced that a deactivated processing element is replaced by a newly-activated element of the same type, such that a workflow that is being processed by the deactivated element can be efficiently migrated to the newly-activated element.

As noted above, the processing elements may be laid out in a three-dimensional layout such that said processing elements are distributed in x-y dimensions and also in a z-dimension perpendicular to said x-y dimensions. The thermal properties of the apparatus may be difference in the z-dimension. For example, the apparatus may comprise multiple planar x-y grids of processing elements, stacked in the z-dimension with insulating material sandwiched between them. In such an example, the thermal diffusion in the z-dimension may be less than the dissipation within the x-y planes. The control circuitry may accordingly permit a closer spatial separation in the z dimension than in the x-y dimensions, between spatial locations of said one or more active processing elements and said one or more inactive processing elements, when determining said one or more inactive processing elements. This maximises the number of processing elements which could be candidates for activation, whilst still allowing thermal limits to be kept.

In an example, the timing parameter corresponds to a time duration for one or more processing elements to be active, prior to being deactivated by the control circuitry. Thus, a given element can be active for said time duration, after which it is deactivated and a newly-activated element takes over. This timing parameter may be based on at least one thermal property of the plurality of processing elements. For example, the timing parameter may be indicative of thermal diffusion within the plurality of processing elements. The timing parameter may be selected to reduce or minimise the rate of activating and deactivating processing elements, whilst also increasing or maximising diffusion of heat from recently-deactivated elements.

In some such examples, the timing parameter is defined at a system level, for example by a manufacturer of the apparatus. However, alternatively, the control circuitry may be configured to determine the timing parameter by measuring said at least one thermal property. This allows for improved selection of the timing parameter, because the control circuitry can effectively take into account the thermal properties of the specific apparatus in its specific configuration (which may be influenced by its surroundings). Such measuring may be performed during an initialisation of the apparatus. Alternatively or additionally, the measuring may be performed at regular intervals during operation of the apparatus, thereby allowing account to be taken of changing thermal properties (for example as a consequence of changes in the surroundings of the apparatus, changing processing conditions, and so on).

In examples, the above-described behaviour of activating and deactivating processing elements is initiated in response to a switching condition being met. Example switching conditions include:

A temperature within said plurality of processing elements exceeding a temperature threshold. Thus, if a peak temperature at a given point within the processing elements exceeds the threshold (e.g. a maximum thermal limit for safe operation), the above-described behaviour may be initiated to reduce the peak temperature whilst minimising the degree to which processing performance is sacrificed.

A power consumption of at least one of said plurality of processing elements exceeding a power threshold. In this example, power consumption is used as a proxy for temperature, which does not require additional temperature measurement.

The temperature within said plurality of processing elements is expected, based on operating conditions, to exceed the temperature threshold. For example, a rate of processing operations performed by the apparatus (or a given element thereof) may be sufficiently high that it is expected that the temperature threshold would be exceeded. As an example, this may be a consequence of the apparatus entering an overclocked state.

The power consumption of at least one of said plurality of processing elements is expected, based on operating conditions, to exceed the power threshold.

Examples of the present disclosure will now be described with reference to the drawings.

FIG. 1 schematically shows a multi-core processor 100 according to an example. The apparatus comprises a multi-core die 105 and a control processor 110. The multi-core processor 105 comprises a 4×4 array of processor cores 115a-115p.

The control processor 110 controls the multi-core die 105, including activating and deactivating cores 115a-115p based on operating conditions. For example, when increased processing power is desired, additional cores may be activated. When decreased processing power is desired, one or more cores may be deactivated. Among other considerations, the control processor 110 is tasked with keeping the temperature of the multi-core die 105 within thermal limits in order to avoid overheating and thermal runaway: a given core 115 will heat up as it is used, and if it is operated for too long then it may exceed a safe operating temperature.

The control processor 110 is configured to perform spatial workload scheduling in order to keep the multi-core die 105 within thermal limits. Spatial workload scheduling is a process of switching between cores 115a-115p based on their physical locations, for example migrating a workload to a core far away from a currently-active core, to keep the maximum temperature of the die 105 within the thermal limit without compromising performance.

The dynamics of how the temperature of the die 105 varies with time when the location of the active core 115a-115p is changed is a result of a complex interplay of several thermal effects. The time scale for heat conduction within a material is governed by its thermal diffusivity, α ($m^2$/s) and is proportional to $L^2/α$, where L is the distance over which the heat is conducted. However, in general, the material will also be losing heat to the environment which slows down the spread of heat within the material.

Figure 2:
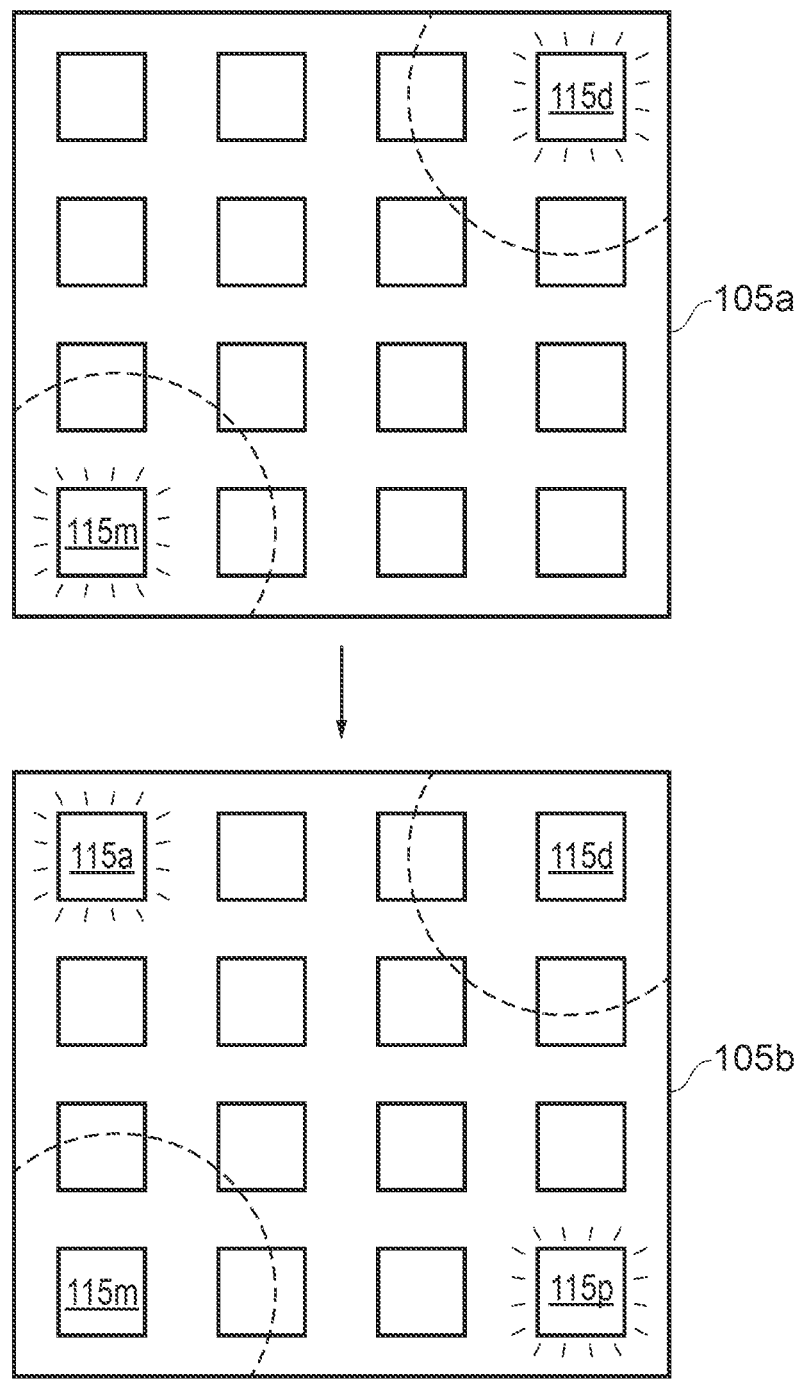
FIG. 2 depicts an example spatial workload scheduling operation.

FIG. 2 depicts the die 105 of FIG. 1, before (105a) and after (105b) a spatial workload scheduling operation is performed.

In its initial configuration, the die 105a has two active cores 115d, 115m which have been active for some time. The highest temperatures (or hotspots) are within the core boundary of each core. However, an area around each core (shown by dashed lines) has been heated by way of heat diffusion from the active cores 115d, 115m. One skilled in the art will appreciate that in practice this will be a steady drop-off of temperature and not a sharp line: the dashed lines of FIG. 2 are merely for illustration.

At a given time, the active cores are switched to the cores 115a, 115p diagonally opposite the previously-active cores 115d, 115m. Immediately following the switching, the die has configuration 105b. It can be seen that, because of the non-instant thermal diffusion within the die 105, the active cores have not yet heated up their surroundings. Furthermore, the hot regions surrounding the previously-active cores 115d, 115m are still present. Over a time period that is dependent on the thermal characteristics of the material, the region surrounding cores 115a, 115p will heat up, and the hot regions surrounding cores 115d, 115m will dissipate. The configuration will then have a configuration akin to a mirror image of configuration 105a. A further spatial workload scheduling operation may then be performed.

In this manner, workloads are switched between cores based on their physical locations. If, for example, a workload was switched to a core adjacent to a previously-active core, the newly-active core would have a higher initial temperature because of absorbing some heat from the adjacent core whilst that core was active.

The objective of spatial switching is thus to move the hotspot location by moving the location of active cores. This switching of cores is performed based on a timing parameter. The timing parameter can be such that the switching time is short enough that the heat from the active core has not travelled to locations away from the hotspot. Otherwise, if the switching time is much longer than the diffusive time scale, the regions away from the hotspot would also get heated up before switching occurs and the intended impact of reducing the hotspot temperature will be reduced. By way of illustrative example, the diffusive time scale on an example silicon substrate corresponding to a distance of 7.5 mm (centre-to-centre distance between cores 115 separated by 4 cores in between) is 0.64 s. Thus, in the present example, a switching time of 0.64 s or less is particularly advantageous.

Figure 3:
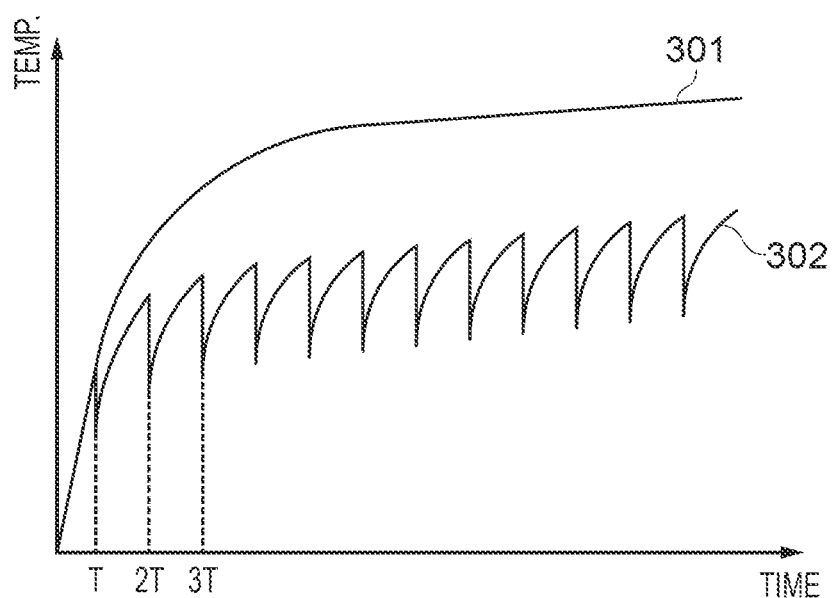
FIG. 3 is a plot of maximum temperature reached within an example processor die.

FIG. 3 shows a plot of maximum temperature within the die 105 vs time, for two cases. Line 301 shows an example in which spatial workload scheduling is not performed, and the die 105 remains in configuration 105a. It can be seen that the temperature initially rises quickly, and then the rate of rise slows as a relatively high peak temperature is reached. In this example, the peak temperature will be within the core boundary of each active core.

Line 302 shows an example in which spatial workload scheduling is performed, such that the die configuration switches between configurations 105 and 105b every t seconds. It can be seen that the maximum temperature (which will generally be at the centres of the currently-active cores 115) remains significantly lower than the temperatures reached without spatial workload scheduling.

If t is relatively large, each core 115 will heat up more prior to switching, which will increase the maximum temperatures reached within the die 105. Conversely, if t is much smaller than the diffusive time scale, there is insufficient time for the heat to dissipate away when the power-generating core is moved to a different location and hence the location does not get enough time to cool down. This can also increase the maximum temperatures reached within the die 105. A very small t can also increase processing overhead as a consequence of the large number of switching operations: each switching operation may incur processing overhead associated with performing the switch. The value of t can thus be tuned for a given system. For example, thermal diffusion could be measured in situ during operation of the system.

Figure 4:
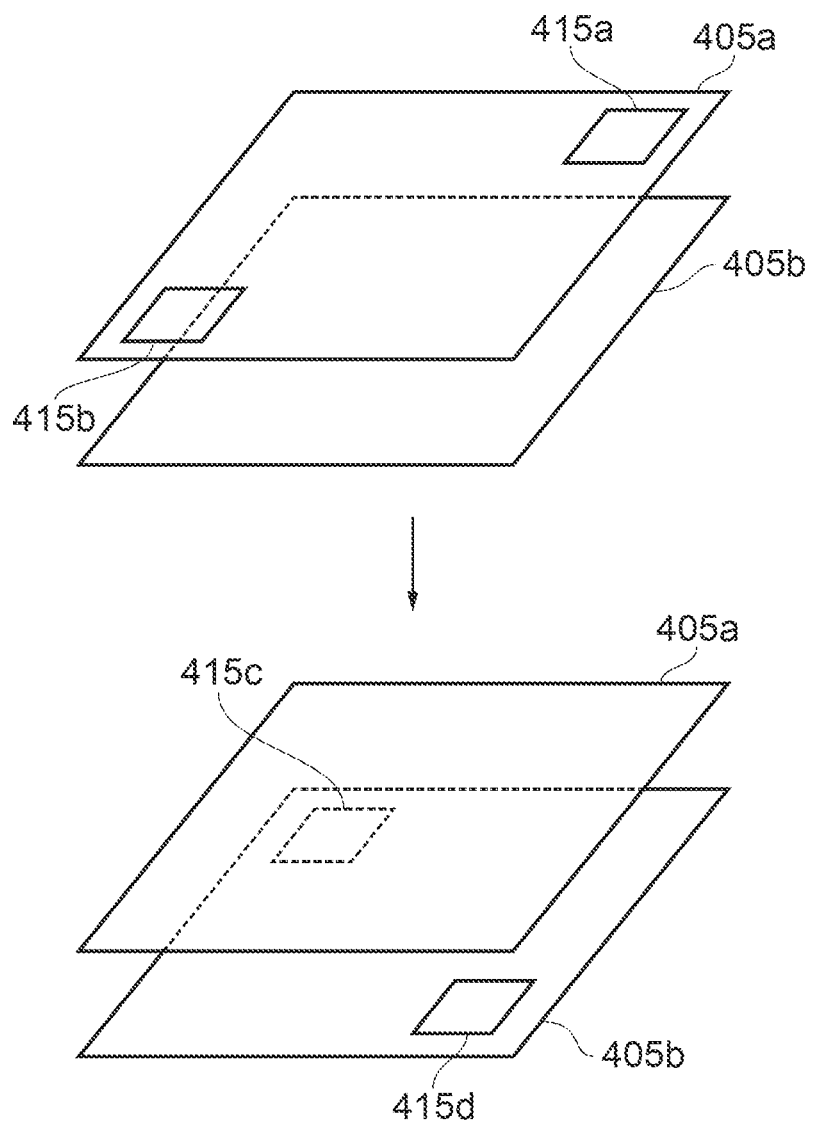
FIG. 4 depicts a multi-core processor according to an example.

The previous discussion has focused on multi-core systems having a two-dimensional array of cores. However, in some examples, a multi-core system can have a three-dimensional spatial configuration. FIG. 4 shows an example of such a system.

In FIG. 4, a multi-core processing apparatus has two dies 405a, 405b. Each die is similar to the die 105 discussed above, and has a 4×4 array of cores 415 (only active cores are shown). The dies are stacked with die 405a above die 405b. The thermal properties in this vertical direction are different from those within the plane of each die. In particular, thermal diffusion in the vertical direction is significantly less (for example because of an insulating material between the dies 405a, 405b).

The top of FIG. 4 shows an initial configuration of the system, in which cores 415a and 415b, in the top die 405a, are active. The bottom of FIG. 4 shows a subsequent configuration, after a spatial scheduling operation has been performed. It can be seen that cores 415a, 415b have been deactivated, and cores 415c, 415d in the lower die 405b have been activated. As a consequence of the aforementioned low thermal diffusivity in the vertical direction, the thermal profile is improved relative to the example of FIG. 2 in which the cores were in the same plane. Furthermore, the example of FIG. 4 provides a greater number of degrees of freedom for the choice of which cores to activate, which can allow greater choice of cores to activate whilst not causing excessive heating.

Figure 5:
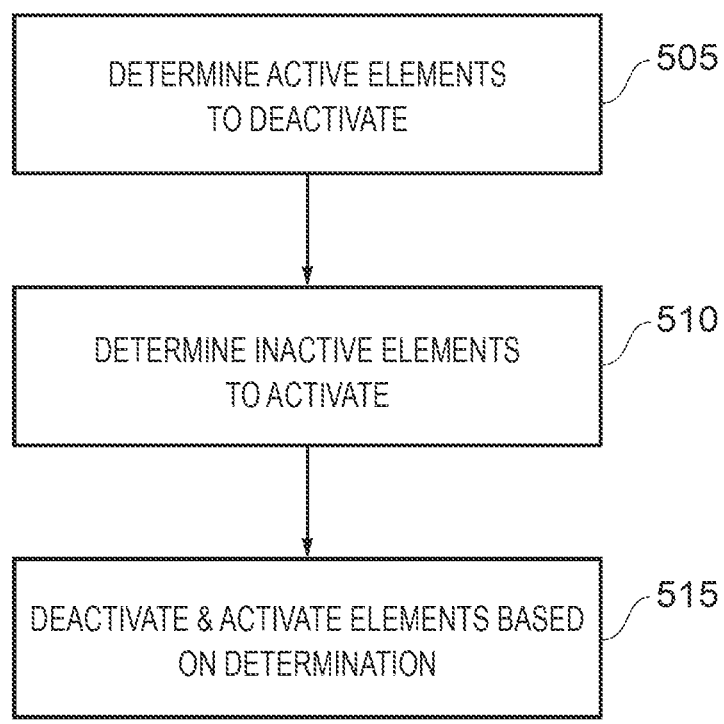
FIG. 5 shows a method according to an example.

FIG. 5 depicts a method according to an example. The method may for example be performed by a control processor as described above.

At block 505, one or more active cores within a multi-core system are selected for deactivation.

At block 510, one or more inactive cores are selected for activation, to replace the active cores selected in block 505.

At block 515, the selected cores are activated or deactivated per the above selections.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 6:
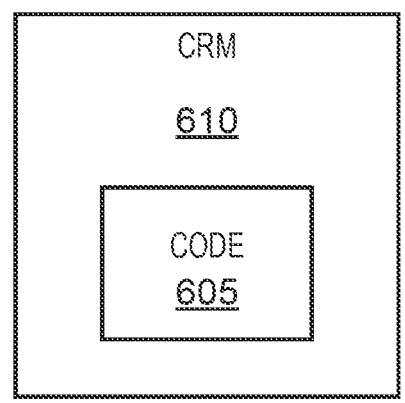
FIG. 6 depicts a computer-readable medium according to an example.

FIG. 6 schematically shows an example of such code 605, stored with a computer-readable medium 610.

Apparatuses and methods are thus provided for reducing the maximum temperature reached within a multi-core processing apparatus, without using performance-reducing techniques such as throttling of core processing power. This is achieved by way of spatial workload management, in which workloads can be switched between different cores on a multi-core die to mitigate the formation of high-temperature hotspots. This switching is performed based on a switching time which is informed by the diffusive time scale, $L^2/\alpha$, which is governed by the material property ($\alpha$) and the distance between the switching cores (L).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present disclosure are set out in the following numbered clauses:

1. An apparatus comprising:
   a plurality of processing elements having a spatial layout; and
   control circuitry to assign workloads to said plurality of processing elements, said control circuitry being configured to, based on a timing parameter:
   determine one or more active processing elements to deactivate;
   determine, based on the spatial layout, one or more inactive processing elements to activate; and
   deactivate said one or more active processing elements and activate said one or more inactive processing elements.

2. An apparatus according to clause 1, wherein the control circuitry is configured to determine said one or more inactive processing elements to activate based on:
   spatial location of each of said one or more active processing elements within the spatial layout; and
   spatial location of each of said one or more inactive processing elements within the spatial layout.

3. An apparatus according to clause 2, wherein the control circuitry is configured to determine said one or more inactive processing elements to activate based on relative spatial locations of said one or more active processing elements and said one or more inactive processing elements.

4. An apparatus according to clause 2 or clause 3, wherein the control circuitry is configured to determine said one or more inactive processing elements to activate based on at least one distance between the spatial location of one or more said active processing elements and the spatial location of one or more said inactive processing units.

5. An apparatus according to clause 4, wherein the control circuitry is configured to maximise said distance, the maximising optionally being subject to at least one additional condition.

6. An apparatus according to clause 4 or clause 5, wherein the control circuitry is configured to determine said one or more inactive processing elements to activate such that said distance exceeds a threshold.

7. An apparatus according to any preceding clause, wherein said spatial layout is a three-dimensional spatial layout such that said processing elements are distributed in x-y dimensions and also in a z-dimension perpendicular to said x-y dimensions.

8. An apparatus according to clause 7, wherein the plurality of processing elements has thermal properties in the z-dimension different from thermal properties in the x-y dimensions.

9. An apparatus according to clause 8, wherein the control circuitry is configured to permit a closer spatial separation in the z dimension than in the x-y dimensions, between spatial locations of said one or more active processing elements and said one or more inactive processing elements, when determining said one or more inactive processing elements.

10. An apparatus according to any preceding clause, wherein the timing parameter corresponds to a time duration for one or more processing elements to be active, prior to being deactivated by the control circuitry.

11. An apparatus according to clause 10, wherein the timing parameter is based on at least one thermal property of the plurality of processing elements.

12. An apparatus according to clause 11, wherein the timing parameter is indicative of thermal diffusion within the plurality of processing elements.

13. An apparatus according to clause 11 or clause 12, wherein the control circuitry is configured to determine the timing parameter by measuring said at least one thermal property.

14. An apparatus according to clause 13, wherein the control circuitry is configured to measure the thermal property at least one of:
    during an initialisation of the apparatus; and
    at regular intervals during operation of the apparatus.

15. An apparatus according to any preceding clause, wherein the control circuitry is configured to perform said determining, deactivating and activating steps responsive to a switching condition being met.

16. An apparatus according to clause 15, wherein the switching condition is at least one of:
    a temperature within said plurality of processing elements exceeding a temperature threshold;
    a power consumption of at least one of said plurality of processing elements exceeding a power threshold;
    the temperature within said plurality of processing elements is expected, based on operating conditions, to exceed the temperature threshold; and
    the power consumption of at least one of said plurality of processing elements is expected, based on operating conditions, to exceed the power threshold; and
    the apparatus has entered an overclocked state.

17. An apparatus according to any preceding clause, wherein the control circuitry is configured to migrate a given workload from a given one of said active processing elements to a given one of said inactive processing elements, responsive to activating said given inactive processing element.

18. An apparatus according to any preceding clause, wherein:
    the apparatus is a multi-core processing apparatus;
    each said processing element is a core of said multi-core processing apparatus; and
    the control circuitry is a system control processor.

19. A method comprising:
    assigning workloads to a plurality of processing elements having a spatial layout; and based on a timing parameter:
        determining one or more active processing elements to deactivate;
        determining, based on the spatial layout, one or more inactive processing elements to activate; and
        deactivating said one or more active processing elements and activating said one or more inactive processing elements.

20. A non-transitory computer-readable medium to store computer-readable code for fabrication of an apparatus comprising:
    a plurality of processing elements having a spatial layout; and
    control circuitry to assign workloads to said plurality of processing elements, said control circuitry being configured to, based on a timing parameter:
        determine one or more active processing elements to deactivate;
        determine, based on the spatial layout, one or more inactive processing elements to activate; and
        deactivate said one or more active processing elements and activate said one or more inactive processing elements.

We claim:

1. An apparatus comprising:
    a plurality of processing elements having a spatial layout; and
    control circuitry configured to assign workloads to said plurality of processing elements, said control circuitry being configured to, based on a timing parameter:
        determine one or more active processing elements to deactivate;
        determine, based on the spatial layout, one or more inactive processing elements to activate; and
        deactivate said one or more active processing elements and activate said one or more inactive processing elements;
    wherein said spatial layout is a three-dimensional spatial layout such that said processing elements are distributed in x-y dimensions and also in a z-dimension perpendicular to said x-y dimensions;
    wherein the plurality of processing elements has thermal properties in the z-dimension different from thermal properties in the x-y dimensions; and
    wherein the control circuitry is configured to permit a closer spatial separation in the z dimension than in the x-y dimensions, between spatial locations of said one or more active processing elements and said one or more inactive processing elements, when determining said one or more inactive processing elements to activate.

2. An apparatus according to claim 1, wherein the control circuitry is configured to determine said one or more inactive processing elements to activate based on:
    the spatial location of each of said one or more active processing elements within the spatial layout; and
    the spatial location of each of said one or more inactive processing elements within the spatial layout.

3. An apparatus according to claim 2, wherein the control circuitry is configured to determine said one or more inactive processing elements to activate based on relative spatial locations of said one or more active processing elements and said one or more inactive processing elements.

4. An apparatus according to claim 2, wherein the control circuitry is configured to determine said one or more inactive processing elements to activate based on at least one distance between the spatial location of one or more said active processing elements and the spatial location of one or more said inactive processing units.

5. An apparatus according to claim 4, wherein the control circuitry is configured to maximise said distance, the maximising optionally being subject to at least one additional condition.

6. An apparatus according to claim 4, wherein the control circuitry is configured to determine said one or more inactive processing elements to activate such that said distance exceeds a threshold.

7. An apparatus according to claim 1, wherein the timing parameter corresponds to a time duration for one or more processing elements to be active, prior to being deactivated by the control circuitry.

8. An apparatus according to claim 7, wherein the timing parameter is based on at least one thermal property of the plurality of processing elements.

9. An apparatus according to claim 8, wherein the timing parameter is indicative of thermal diffusion within the plurality of processing elements.

10. An apparatus according to claim 8, wherein the control circuitry is configured to determine the timing parameter by measuring said at least one thermal property.

11. An apparatus according to claim 10, wherein the control circuitry is configured to measure the thermal property at least one of:
   during an initialisation of the apparatus; and
   at regular intervals during operation of the apparatus.

12. An apparatus according to claim 1, wherein the control circuitry is configured to perform said determining, deactivating and activating steps responsive to a switching condition being met.

13. An apparatus according to claim 12, wherein the switching condition is at least one of:
   a temperature within said plurality of processing elements exceeding a temperature threshold;
   a power consumption of at least one of said plurality of processing elements exceeding a power threshold;
   the temperature within said plurality of processing elements is expected, based on operating conditions, to exceed the temperature threshold;
   the power consumption of at least one of said plurality of processing elements is expected, based on operating conditions, to exceed the power threshold; or
   the apparatus has entered an overclocked state.

14. An apparatus according to claim 1, wherein the control circuitry is configured to migrate a given workload from a given one of said active processing elements to a given one of said inactive processing elements, responsive to activating said given inactive processing element.

15. An apparatus according to claim 1, wherein:
   the apparatus is a multi-core processing apparatus;
   each said processing element is a core of said multi-core processing apparatus; and
   the control circuitry is a system control processor.

16. A method comprising:
assigning workloads to a plurality of processing elements having a spatial layout; and
based on a timing parameter:
   determining one or more active processing elements to deactivate;
   determining, based on the spatial layout, one or more inactive processing elements to activate; and
   deactivating said one or more active processing elements and activating said one or more inactive processing elements,
wherein said spatial layout is a three-dimensional spatial layout such that said processing elements are distributed in x-y dimensions and also in a z-dimension perpendicular to said x-y dimensions;
wherein the plurality of processing elements has thermal properties in the z-dimension different from thermal properties in the x-y dimensions; and
wherein a closer spatial separation is permitted in the z dimension than in the x-y dimensions, between spatial locations of said one or more active processing elements and said one or more inactive processing elements, when determining said one or more inactive processing elements.

17. A non-transitory computer-readable medium to store computer-readable code for fabrication of an apparatus comprising:
a plurality of processing elements having a spatial layout; and
control circuitry to assign workloads to said plurality of processing elements, said control circuitry being configured to, based on a timing parameter:
   determine one or more active processing elements to deactivate;
   determine, based on the spatial layout, one or more inactive processing elements to activate; and
   deactivate said one or more active processing elements and activate said one or more inactive processing elements;
wherein said spatial layout is a three-dimensional spatial layout such that said processing elements are distributed in x-y dimensions and also in a z-dimension perpendicular to said x-y dimensions;
wherein the plurality of processing elements has thermal properties in the z-dimension different from thermal properties in the x-y dimensions; and
wherein the control circuitry is configured to permit a closer spatial separation in the z dimension than in the x-y dimensions, between spatial locations of said one or more active processing elements and said one or more inactive processing elements, when determining said one or more inactive processing elements.

* * * * *